May 7, 1935.  H. S. BLACK  2,000,505
VACUUM TUBE APPARATUS
Filed Sept. 26, 1933   3 Sheets-Sheet 1
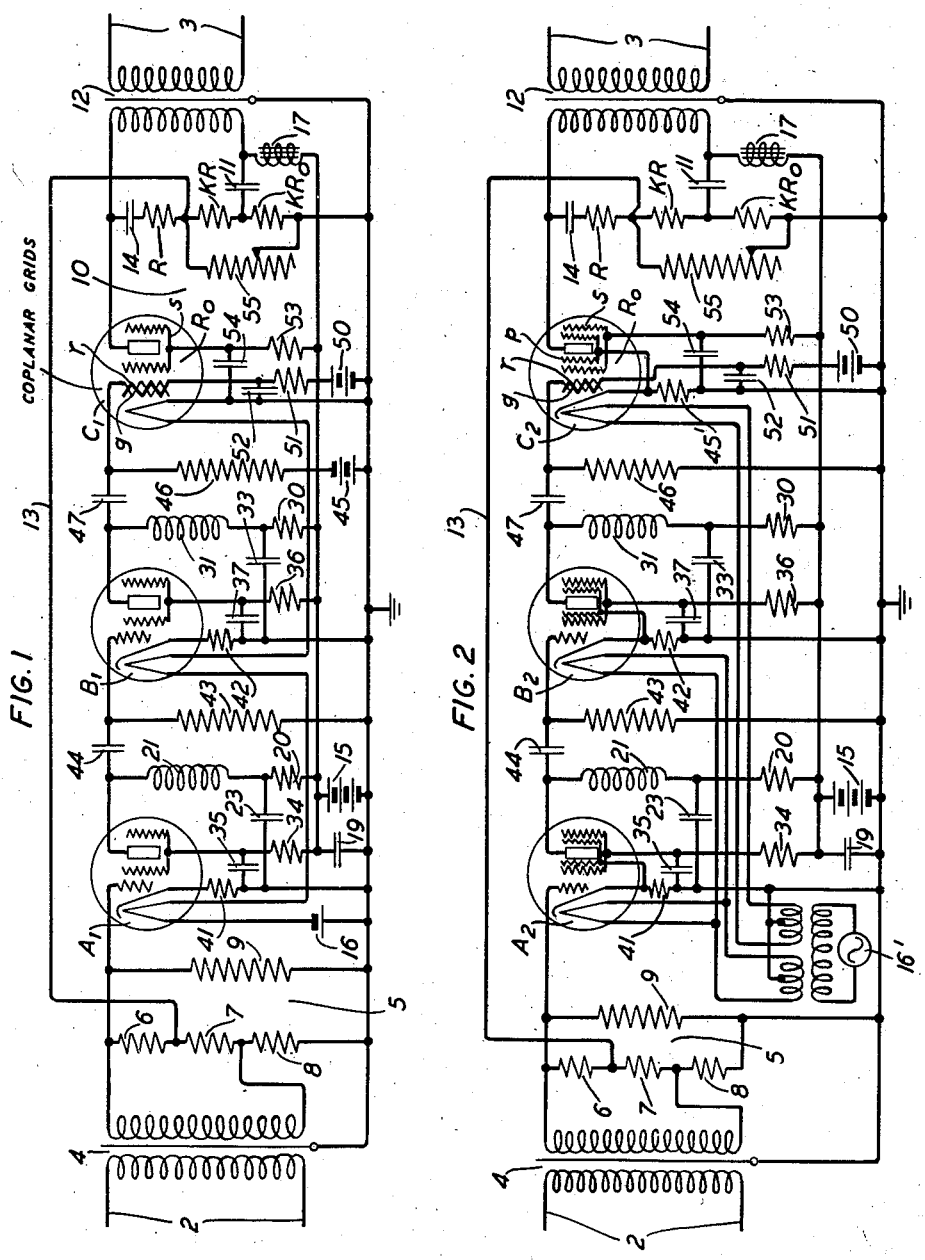
INVENTOR
*H.S. BLACK*
BY
*ATTORNEY*

May 7, 1935. H. S. BLACK 2,000,505
VACUUM TUBE APPARATUS
Filed Sept. 26, 1933 3 Sheets-Sheet 2

INVENTOR
*H. S. BLACK*
BY
*H. A. Burgess*
ATTORNEY

May 7, 1935. H. S. BLACK 2,000,505
VACUUM TUBE APPARATUS
Filed Sept. 26, 1933  3 Sheets-Sheet 3

INVENTOR
H. S. BLACK
BY
ATTORNEY

Patented May 7, 1935

2,000,505

UNITED STATES PATENT OFFICE 2,000,505

VACUUM TUBE APPARATUS

Harold S. Black, Westfield, N. J., assignor to Bell Telephone Laboratories, Incorporated, New York, N. Y., a corporation of New York Application September 26, 1933, Serial No. 691,001

6 Claims. (Cl. 179—171)

This invention relates to vacuum tube apparatus, as for instance vacuum tube amplifying apparatus.

An object of the invention is to improve operation of such apparatus, as for example to reduce distortion produced by the apparatus in waves it transmits or increase stability of operation of the apparatus.

Certain expressions as used herein have the following significance with reference to vacuum tube amplifiers. Amplification of an amplifier without feedback is the quantity by which the voltage on the grid of the first tube must be multiplied to obtain the phase and magnitude of the resulting voltage generated in the plate circuit of the last tube, or the voltage of an equivalent fictitious generator in series with the internal plate resistance of the last tube. This amplification will be designated $\mu$ (and is a complex quantity). The amplification radio is the absolute value of the amplification. Gain is twenty times the logarithm of the amplification ratio.

The complex quantity $\mu\beta$ will be used herein to designate the ratio by which a voltage of a wave is modified in a single propagation around the closed feedback loop of a feedback amplifier. It follows that $\beta$ is the complex quantity by which a driving voltage in the space path of the last tube, in series with the internal plate-filament impedance $R_0$ of that tube, must be multiplied to give the voltage that it—the driving voltage alone—, acting through the feedback path, will produce on the grid of the first tube.

As shown in my copending application Serial No. 606,871, filed April 22, 1932, for Wave translation systems, of which this application is a continuation in part, the amplification of a feedback amplifier is $$\frac{\mu}{1-\mu\beta}$$

and the corresponding change in amplification caused by the feedback action is $$\frac{1}{1-\mu\beta}$$

The quantity $$\frac{1}{1-\mu\beta}$$

is a quantitative measure of the amount of feedback, and herein, as in that application, the feedback is described as positive feedback or negative feedback according as the absolute value of $$\frac{1}{1-\mu\beta}$$

is greater or less than unity. As pointed out in that application, when $\mu\beta>1$ the amplification with feedback approaches $$-\frac{1}{\beta}$$

which is largely independent of the amplification or variations in amplification of the tubes, and consequently the amplifier gain is stabilized; and, as also pointed out therein, the negative feedback then reduces the modulation produced by the amplifier in substantially the same proportion that it reduces the gain.

In certain aspects the present invention is an improvement in amplifiers of the general type in which waves, including those of the range of transmitted frequencies, are so fed back from the output to the input as to reduce the gain of the amplifier below the value that it would have without feedback in order to reduce unwanted modulation or non-linear effects and render the gain stability greater than it would be without feedback. That type of amplifier is disclosed for example in my above mentioned copending application and in H. Nyquist Patent 1,915,440, June 27, 1933 and in British Patents 317,005 and 371,887.

In such amplifiers, where tube modulation reduction for modulation components of given frequencies is to be large, it is proportional to the gain (for those modulation components) in a single trip around the closed feedback loop and consequently that gain should be large. The modulation components that it is desired to reduce by feedback are usually waves of frequencies within the utilized frequency range, e. g. within the range of the frequencies of the signal waves to be amplified by the amplifier. In practice, when the loop gain (i. e., the decibel gain for a single trip around the loop) is large for the frequencies of the utilized frequency range, it is greater than zero for some higher frequency and if the loop phase shift (i. e. the phase shift experienced by waves in passing once around the loop) is zero or a multiple of 360° for any frequency at which the loop gain equals or exceeds zero decibels, the amplifier may sing at that frequency. To avoid singing, it is desirable to control the loop phase shift and the loop gain carefully with respect to the entire frequency spectrum, and in practice it is usually desirable to have $$\mu\beta = |\mu\beta| \angle \Phi$$

such that $\Phi$ is never zero or a multiple of 360° for $$|\mu\beta| \geq 1$$

This restriction is sufficient, though not always necessary. As indicated in my above mentioned copending application, a criterion for freedom from singing is given by Nyquist's rule, in his article on "Regeneration Theory", Bell System Technical Journal, January, 1932, pages 126 to 147. The criterion is given also in Nyquist patent 1,915,440 referred to above.

The difficulty of insuring against singing is in general increased by the fact that when the distortion reduction and associated amplifier gain reduction produced by feedback action is to be large, the gain of the amplifier without feedback must then correspondingly exceed the gain required with feedback; because when the gain without feedback, required to produce the desired amount of distortion reducing feedback and the desired amount of gain with feedback necessitates use of a number of stages and a number of interstage coupling circuits, the phase shifts around the closed loop may become large. For example, they may become large at frequencies well above the utilized frequency range because of shunt capacitance, for instance tube and wiring capacities.

In one specific aspect the present invention is a three stage feedback amplifier of the type described above in which the first two stages comprise tandem connected high $\mu$ screen grid amplifying tubes providing high gain and the third stage employs a coplanar grid type of amplifying tube that has high efficiency, low harmonic level and large load capacity. The odd number of the stages can facilitate proper phase control by providing a phase shift in the tubes which is an odd multiple of 180°, and the high amplification factors of the tubes in the first two stages can facilitate the use of a tube of high power capacity and ordinarily entailed relatively low amplification factor in the third stage without undue limitation of the gain of the three stages and moreover, can facilitate phase control in the feedback loop circuit by affording the required gain with a minimum number of interstage circuits.

The coplanar grid tube may be, for example, of the type disclosed by H. A. Pidgeon and J. O. McNally in their Patent No. 1,923,686, granted August 22, 1933, or in their Patent No. 1,920,274, granted August 1, 1933, or in their paper published in the Proceedings of the Institute of Radio Engineers, vol. 18, pages 226–293, February, 1930. Such a tube has two grids, each active elementary area on either grid being close to a corresponding active area on the other grid and being at substantially the same location as that corresponding area with respect to the cathode and the anode or plate. By way of example, each grid may have its lateral wires lie in the same surface, for instance plane or cylindrical surface, as the lateral wires of the other grid and alternate with them. The tube may have the flat type electrode structure disclosed in the above mentioned patents and paper of Pidgeon and McNally. Such electrode structure affords large electrode surfaces between which electrons may flow, with relatively small interelectrode spacing, and is thus well adapted for large power output. As brought out by the above mentioned disclosures of Pidgeon and McNally, a vacuum tube having a space charge grid in coplanar relation with a control grid is especially adapted for operation as a power tube by employing a high value of control grid negative biasing potential and a control grid input voltage wave of large amplitude (i. e., large grid swing) and a high positive biasing voltage on the space charge grid coplanar with the control grid. Quantitatively, assuming a plate voltage of 130 volts for example, the coplanar grid tube has an efficiency of approximately 50% as compared with 4% in the case of three element tubes, and the second order harmonic level of the coplanar grid tube is 36 db. below the fundamental at the point where the grid is driven positive whereas the three element tube has a harmonic level that is in general about 25 db. below the fundamental at the same point.

Although, as indicated above, the high amplification factors of the screen grid tubes tends to facilitate use of coplanar grid tube in the last stage, the high plate impedance of the screen grid tube in the penultimate stage renders it difficult to use the coplanar grid tube to advantage for high carrier frequencies, because the effective input impedance of the coplanar grid tube is comparatively so low at such frequencies. This difficulty is accentuated because the coplanar grid tube has a low amplification factor and requires a high applied voltage to drive it effectively. In accordance with the present invention the screen grid tube of the penultimate stage of a feedback amplifier of the type described above may feed into a coplanar grid tube provided with a third grid interposed between the plate and the coplanar grids and serving as a screen grid that lessens the internal capacity between the plate and the control grid in the tube and decreases the effective input capacity of the tube and prevents undue lowering of the effective input impedance of the tube at high carrier frequencies. The tube will have its plate impedance lowered and its power capacity increased by the space charge grid coplanar with the control grid.

However, the screen grid of the coplanar grid tube tends to limit the permissible magnitude of the control grid driving voltage and consequently the power output of the amplifier; for when the control grid approaches instantaneous potentials such that the instantaneous anode potential becomes lower than the positive potential of the screen grid, serious harmonic production may result. In accordance with a further feature of the invention, this effect is eliminated by the addition of still another element, a screen or grid between the other three grids and the anode, this additional element, (as in the case of the grid next to the anode in vacuum tubes of the power pentode type), being connected to the cathode and shielding the anode from the other elements.

In accordance with a further feature of the invention, a fifth grid is provided in the coplanar grid tube just described, this fifth grid being interposed between the filament or cathode and the other grids and maintained at a small positive potential (with respect to the cathode) for serving as an additional space charge grid to increase the efficiency with which electrons are given off from the cathode and in this way decrease the plate-to-cathode resistance in the tube.

This additional space charge grid may be employed whether or not there is provided the grid connected to the cathode and interposed between the anode and the other electrodes for screening the plate from the other electrodes.

According to still another feature of the invention, one or more of the tubes in the portion of the amplifier preceding the coplanar grid is of the pentode type, since it is found that, at least in the penultimate stage of the amplifier, objectionable harmonics may result from the plate potential being driven lower than the screen grid potential, the coplanar grid tube being adapted to operate with large grid swing as indicated above.

Other aspects of the invention are coplanar grid vacuum tubes having certain grids in addition to the control grid and the space charge grid coplanar therewith; and still other objects of the invention are vacuum tube circuits comprising such tubes and means for maintaining their electrodes at certain desirable operating potentials.

Other objects and aspects of the invention will be apparent from the following description and claims.

In the drawings, Figs. 1, 2, 3 and 4 show four different embodiments of the invention;

Figure 3:
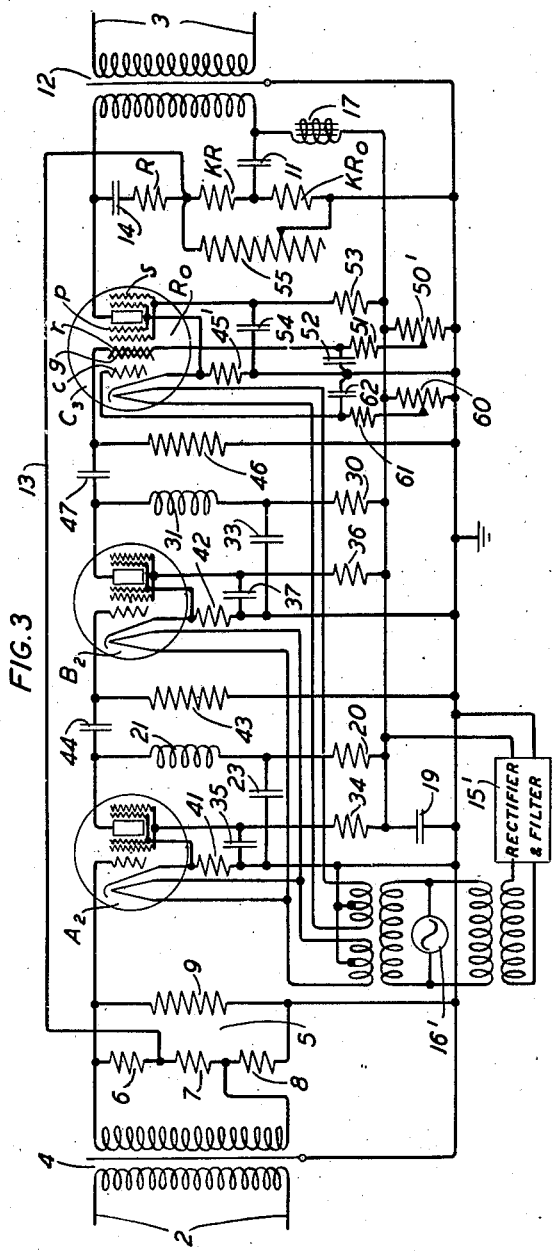

In the amplifying system of Fig. 1, a negative feedback amplifier comprising vacuum tubes $A_1$, $B_1$ and $C_1$ in cascade connection amplifies waves received over incoming line or circuit 2 and transmits the amplified waves to outgoing line or circuit 3. The circuits 2 and 3 may be, for example, sections of a non-loaded multiplex carrier telephone cable circuit, the amplifier amplifying simultaneously the waves of a number of carrier telephone channels and/or carrier telegraph channels, extending over a frequency range from 8 kilocycles to 100 kilocycles for instance.

The incoming circuit 2 comprises an input transformer 4 and is connected to the input side of the amplifier through the transformer 4 and a Wheatstone bridge 5. The four ratio arms of the bridge comprise the four resistances 6, 7, 8, and 9, respectively. The circuit 2 is connected across the arms 6 and 7 in series and forms one diagonal of the bridge. The input circuit of the amplifier is connected across the arm 9.

The output circuit of the amplifier is connected to the outgoing or load circuit 3 through a Wheatstone bridge 10 and a stopping condenser 11, the stopping condenser having negligibly low reactance for the waves to be amplified.

An output transformer 12 is included in the outgoing circuit. The space discharge path resistance or impedance $R_0$ of the last stage of the amplifier is one ratio arm of the bridge, and the circuit 3 is the output diagonal of the bridge. The four ratio arms of the bridge are designated by their impedance values $R_0$, $KR_0$, $KR$ and $R$, where $R$ and $R_0$ may be resistances and $K$ a constant, or where $R$, $R_0$ and $K$ may be complex quantities or quantities of any suitable values.

Across the resistances $KR$ and $KR_0$ in series is connected the input end of a feedback path for the amplifier, comprising conductor of feedback lead 13 and ground, the output end of this path being connected across the arms 7 and 8 of bridge 5. Thus, the feedback path is a diagonal, (the feedback diagonal), of output bridge 10, and is also a diagonal of the input bridge 5. Thus, the bridge 10 connects the outgoing circuit 3 and the feedback path in conjugate relation to each other, and the bridge 5 connects the incoming circuit 2 and the feedback path in conjugate relation to each other. Consequently, as explained in the above mentioned copending application Serial No. 606,871 or British Patent 371,887 for example, the feedback action and the operation of the amplifying system are independent of the impedance of the incoming circuit and the impedance of the load circuit, and moreover can not affect the impedances which face the incoming circuit and the load circuit at the amplifying system.

The amplifier is of the general type referred to above as disclosed in the above mentioned copending application Serial No. 606,871, Nyquist Patent 1,915,440 and British Patents 371,005 and 371,887, the feedback reducing the amplifier gain but at the same time, reducing the transmission distortion and stabilizing the amplifier, as for example, against changes which tend to result from variations of tubes or tube energizing power that occur in the system.

As indicated above, the amplifier may have any number of stages, but the number of stages should be such that the phase shift around the complete feedback loop circuit (including the tubes and the other portions of the loop) is not such as to cause the amplifier to sing; and in practice this usually means that $\mu\beta$ being $$|\mu\beta| < \Phi$$

for every frequency in the frequency spectrum at which $$|\mu\beta|$$

is equal to or greater than unity, the angle $\Phi$ differs from zero and from $n \times 360°$ where $n$ is any integer, (this condition being always sufficient, though not always necessary).

The amplifier is shown as a three stage amplifier, the first two stages comprising, for example, two shield grid or screen grid vacuum tubes $A_1$ and $B_1$ of high amplification factor and of the unipotential cathode or heater type, as for instance Western Electric Company type 259—A vacuum tubes, and the third stage comprising, for example, a coplanar grid tube of the type referred to above having a control grid $g$, a space charge reducing grid $r$ coplanar therewith and a screen grid $s$ structurally and functionally similar to the screen grids of tubes $A_1$ and $B_1$.

These three tubes have a common plate battery 15 and a filament heating battery 16 sending heating current through the filaments of the three tubes in series.

Plate current for tube $C_1$ passes from battery 15 through choke coil 17 and the primary winding of output transformer 12 to the plate of the tube and is prevented from reaching resistance $R$ by a stopping condenser 14. Condensers 19 and 11 cooperate with the choke coil 17 to prevent voltage fluctuations in the battery circuit from reaching the plate and to prevent the A. C. plate voltage from causing feedback in the amplifier through the common battery circuit. The stopping condenser 11 prevents voltage from battery 15 from reaching resistance $KR_0$ and $KR$ and is a by-pass condenser for waves of the frequency to be amplified.

Plate current for tube $A_1$ passes from battery 15 to the plate through a resistance 20 and an interstage coupling impedance or choke coil 21. The resistance 20 and a condenser 23 in conjunction with the condenser 19, form a frequency selective circuit for preventing voltage fluctuations in the battery circuit from reaching the plate and for preventing the waves in the A. C. output circuit of the tube from passing to the portions of the plate battery circuit common to a plurality of tubes of the amplifier. The condenser 23 is a by-pass condenser for waves of the frequency to be amplified. The choke coil 21 may have a high resistance, for reducing phase shift in the amplifier (especially at frequencies below the utilized frequency range) which tends to result from the shunting of the transmission path by portions of the space current supply circuit.

Plate current for tube B₁ passes from battery 15 through a resistance 30 and a choke coil 31 to the plate of the tube. Elements 30 to 33 function in connection with tube B₁ in the manner in which elements 20 to 23 function in connection with tube A₁.

Battery 15 supplies steady positive biasing potential for the screen grid of tube A₁ through a frequency selective network comprising a series resistance arm 34 and shunt capacity arms 35 and 19, and supplies steady positive biasing potential for the screen grid of tube B₁ through a frequency selective network comprising a series resistance arm 36 and shunt capacity arms 37 and 19. These networks prevent voltage variations from the plate battery circuit and voltage waves from the A. C. output circuits of tubes A₁ and B₁ from reaching the screen grids, and prevent waves in the screen grid circuits from passing to portions of the plate battery circuit common to a plurality of tubes of the amplifier. The resistances 34 and 36 adjust the voltages applied from battery 15 to the screen grids of tubes A₁ and B₁, respectively, to the proper operating values.

Negative biasing potentials for the control grids of tubes A₁ and B₁ are obtained from the voltages across resistors 41 and 42, respectively, that result from flow of the space currents of the respective tubes through those resistors. The voltage across resistor 41 reaches the control grid of tube A₁ through resistor 9 and also through resistances 8, 7 and 6 in series, and also through resistance 8 and the secondary winding of input transformer 4 in series. The voltage across resistor 42 reaches the control grid of tube B₁ through grid leak resistor 43; and stopping condenser 44 prevents unidirectional potential from resistance 42 from reaching choke coil 21 or the plate of tube A₁.

Negative biasing potential for control grid $g$ of tube C₁ is supplied from battery 45 through grid leak resistor 46, and is prevented by a stopping condenser 47 from reaching choke coil 31 or the plate of tube B₁.

Positive biasing potential for the coplanar grid $r$ of tube C₁ is supplied from battery 40 through a resistance-capacity network for segregating this grid from the other elements of the system as regards A. C. voltages. The network comprises a series resistance arm 51 and a shunt capacity arm 52.

Positive biasing potential for screen grid $s$ of tube C₁ is supplied from battery 15 through a resistance-capacity network for segregating this grid from the other elements of the system as regards A..C. voltages. The network comprises a series resistance arm 53 and a shunt capacity arm 54. The resistance arm 53 also adjusts the screen grid voltage to the proper value.

A variable resistance 55, connected across resistance KR and KR₀ forms a shunt across the feedback path, adjustable for varying the gain of the amplifier without varying the impedance presented by the amplifier to circuit 2 or circuit 3. Decreasing the resistance 55 lowers the amount of feedback, which increases the amplifier gain as indicated above and as explained in the above mentioned copending application Serial No. 606,871 or British Patent 371,887 for example.

As indicated above and in Fig. 1, in passing from the cathode of tube C₁ to its plate or anode the coplanar grids $g$ and $r$ which are in the same plane or surface are first encountered, and then the screen grid $s$ which is interposed between the coplanar grids and the plate reduces the capacity between the plate and the control grid.

As indicated above, by making $$|\mu|$$

in this amplifier much greater than unity, $$|\mu\beta|$$

can be made much greater than unity or sufficiently large to yield the desired amount of amplifier distortion reduction, and yet the amplification of the amplifier and the db. gain of the amplifier can be large; but in practice the difficulty of proper phase control for insuring that the regenerative amplifier will not sing at any frequency in the frequency spectrum, ordinarily increases with increase of $$|\mu\beta|$$

By making the amplifier a three-stage amplifier the odd number of stages can facilitate proper phase control by providing a phase shift in the tubes which is an odd multiple of 180°, and the small number of stages can facilitate proper phase control by avoiding necessity for a large number of interstage coupling circuits. The high amplification factors of the tubes A₁ and B₁ facilitate obtaining $$|\mu|$$

sufficiently large with only three stages, and this is of especial importance because the coplanar grid tube, which is of value in the last stage on account of its high efficiency, low harmonic level and large load capacity, unfortunately has a low amplification factor, and moreover would have a low effective input impedance but for the screen grid $s$, which reduces the difficulty of operating the coplanar grid tube efficiently and with desired large grid swing from the screen grid tube B₁ of high plate impedance.

However, with the circuit of Fig. 1, the screen grid $s$ of the coplanar grid tube tends to limit the power output of the amplifier, because when the instantaneous anode potential is driven lower than the positive potential of the screen grid serious distortion may result from secondary electrons liberated from the plate and collected by the screen grid.

Fig. 2 shows a system in which this effect is eliminated by a screen or grid $p$. The system of Fig. 2 is shown with its filaments heated from an A. C. source 16′ and with the cathode of its last stage indirectly heated, but is generally similar to the system of Fig. 1 except that tubes A₂, B₂ and C₂ are used instead of tubes A₁, B₁ and C₁, respectively. Tube C₂ has control grid $g$ and space charge reducing grid $r$, which may be coplanar therewith, in the same surface between the cathode and the anode, and has screen grid $s$ between the anode and the other two grids, these three grids $g$, $r$ and $s$ functioning in the same manner as grids $g$, $r$ and $s$, respectively, of Fig. 1. The grid or screen $p$ is located between the plate of tube C₂ and the positively biased screen grid $s$, and is maintained at a potential (preferably at or near that of the cathode) lower than the lowest potential to be reached by the plate, thus preventing secondary electrons from the plate escaping to the positively charged screen grid $s$. This permits operation with the plate biased to a potential only a little higher than that of the screen grid $s$ or even equal to the potential of grid $s$. As shown, the grid $p$ is connected to the cathode, to be maintained at the cathode potential. Grid $g$ is shown as receiving negative biasing potential through resistance 46 from voltage developed across resistance 45' by flow of the space current of tube $C_2$ through the resistance 45'. If desired, the filament of tube $C_2$ may itself be the cathode, (instead of being a heating element for an indirectly heated cathode), and in that case the midpoint of the transformer winding supplying heating current to the filament may be grounded through resistance 45' (instead of directly, as shown). If the cathode be indirectly heated (as indicated in Fig. 2), it may be any suitable type of indirectly heated cathode, as for example, a metallic cylinder, flattened if desired, preferably as usual corresponding in shape to the anode or plate electrode and coated with electron emitting material and surrounding the heating element and insulated therefrom by refractory insulating material.

Tubes $A_2$ and $B_2$ differ from tubes $A_1$ and $B_1$ by being of the pentode type. That is, tubes $A_2$ and $B_2$ have an additional grid or screen, placed between the plate and the positively biased screen grid and maintained at some potential (usually at or near that of the cathode) lower than the lowest potential to be reached by the plate. As shown, the additional grid is connected to the cathode, to be maintained at the cathode potential. It is desirable to use the pentode type of tube in especially the penultimate stage of the amplifier, as it has been found that, in the stage preceding that employing the coplanar grid tube, the signal peaks carry the anode voltage below the voltage of the positively biased screen grid and tend to introduce distortion, which is avoided by use of the pentode type of tube.

Notwithstanding the effect of the space charge reducing grid $r$ in the tube $C_2$, the plate resistance of such a tube may be objectionably high where large power output is desired. Fig. 3 shows a circuit generally similar to that of Fig. 2, but with a tube $C_3$ in place of tube $C_2$ of Fig. 2, the tube $C_3$ being similar to tube $C_2$ except for the addition of a space charge reducing grid or element $c$ between the cathode and the other grids. This grid $c$ is maintained at a small positive potential with respect to the cathode by connection to potentiometer 60, which is fed from rectifier and filter 15', which in turn is fed from source 16' and functions in the circuit of Fig. 3 as battery 15 functions in the circuit of Fig. 2. A frequency selective network comprising a series arm of resistance 61 and a shunt arm of capacity 62 isolates grid $c$ as regards alternating or varying voltages. In Fig. 3 a potentiometer 50' fed from rectifier and filter 15' functions as battery 50 functions in Fig. 2. If desired, in Fig. 3 the filament may itself be the cathode, as described for the filament of tube $C_2$ of Fig. 2.

Figure 4:
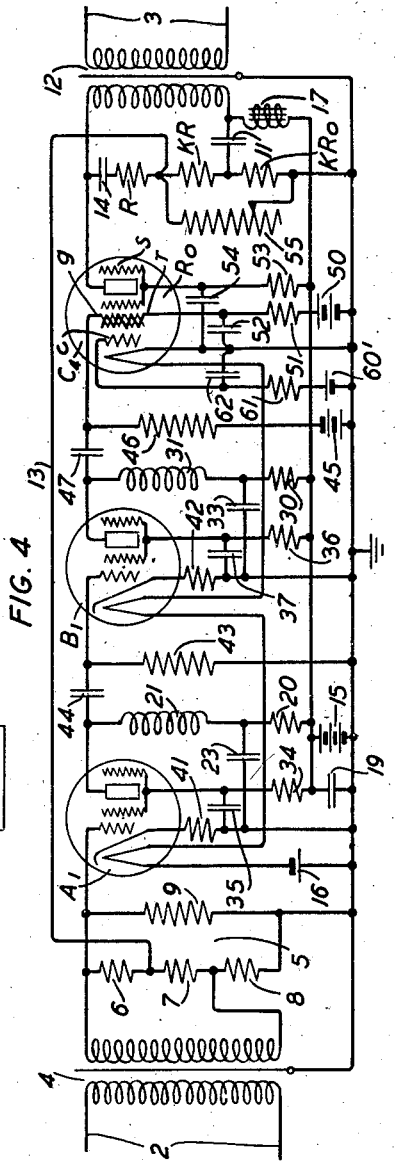

Fig. 4 shows a system generally similar to that of Fig. 1, but with the tube $C_1$ of Fig. 1 replaced in Fig. 4 by a tube $C_4$ which is like the tube $C_1$ except for the addition of a grid or element $c$ between the filament or cathode and the coplanar grids $g$ and $r$, the grid $c$ functioning as grid $c$ in tube $C_3$ of Fig. 3 functions, to increase the efficiency with which electrons are given off from the filament or cathode and to thereby reduce the plate resistance and increase the power capacity of the tube. In Fig. 4 a battery 60' is shown, instead of the potentiometer 60 of Fig. 3, for supplying a small positive potential to grid $c$.

Figure 5:
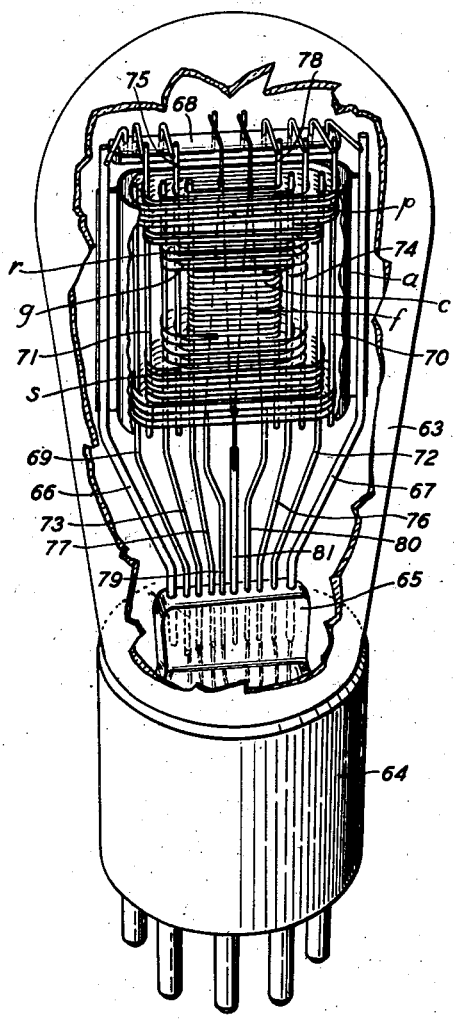
Fig. 5 shows in perspective an embodiment of a discharge device employed in the last stage of Fig. 3.
Figure 7:
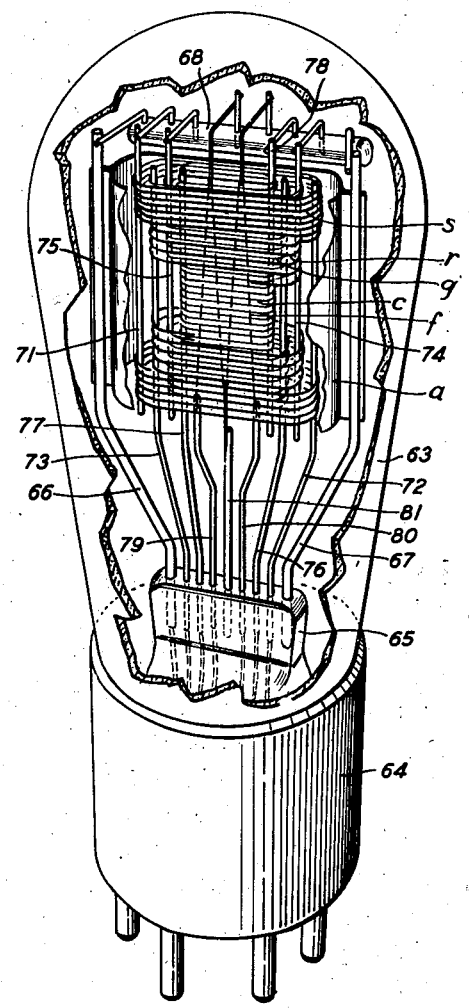
Fig. 7 illustrates the structure of a device which is employed in the last stage of Fig. 2.
Figure 6:
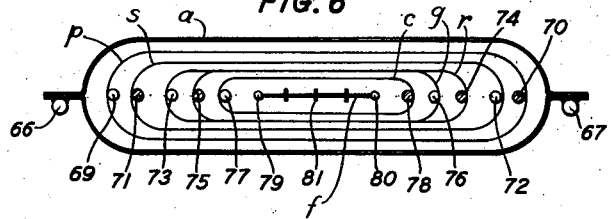
Fig. 6 is a plan view of the electrode spacing in the device of Fig. 5.

A representative embodiment of the coplanar grid pentode type tube designated as $C_3$ in Fig. 3 is shown in Fig. 5 and comprises an evacuated vessel 63 provided with a base 64 carrying terminals for the various electrodes within the vessel. An inwardly projecting stem 65 on the vessel supports a plurality of upright wires attached to the various electrodes and serving as conductors for applying various potentials to the electrodes. For instance, upright wires 66 and 67 support a flattened cylindrical metallic plate or anode $a$. An elongated insulating bead 68 is supported from the upper ends of the wires 66 and 67 and carries a plurality of spaced stub wires for supporting the upper ends of the various electrodes within the anode. A helical wire grid $p$ is spaced from the surface of the anode $a$ and conforms to the configuration thereof. This grid is supported by upright wire 69 on one side and wire 70 on the other side which is attached to one of the stub wires in the bead 68. Within the grid $p$ is a second grid $s$ having the same form but of smaller dimensions and this grid is supported by a wire 71 attached to a stub wire on the bead 68 and an upright wire 72 which is joined to the stem 65 of the vessel. Within the grid $s$ are two coplanar grids $g$ and $r$ which have their flat portions in equal special relation to the grid $s$. The grid $r$ is supported by upright wire 73 on one side and by wire 74 on the other side which is attached to the stub wire in bead 68, while the grid $g$ is supported by a wire 75 on one side which is attached to one of the stub wires in the bead 68 and on the other side as supported by upright wire 76. Another smaller grid $c$ is positioned within the coplanar grids $g$ and $r$ and is supported by upright wire 77 on one side and a short wire 78 on the other side which is attached to a stub wire in the bead 68. Within the grid $c$ is an M-shaped filament $f$ attached to two leading-in wires 78 and 79 in the stem 65 and an anchor wire 80 coupled to the midpoint of the filament. The lights of the M-shaped filament are held under tension by two hooks attached to stud wires on the bead 68. The tube shown in Fig. 7 is similar to the tube described in Fig. 5 and is representative of an embodiment of the tube $C_2$ shown in Fig. 2. The only difference between Fig. 7 and Fig. 5 is the removal of the grid $p$ from the structure described in Fig. 5.

What is claimed is:

1. A vacuum tube amplifier comprising three tubes in cascade connection and means for reducing distortion of waves transmitted therethrough by feedback of distortion components originating in the amplifier, each of said tubes comprising a cathode and an anode and a negatively biased control grid therebetween, each of the first two tubes having a positively biased screen grid between its anode and its control grid for reducing its anode-control grid electrostatic capacity, and the third tube having its control grid fed from the second tube and having a positively biased space charge reducing grid principally in the same surface as its control grid and at substantially the same location as said control grid with respect to its anode and its cathode.

2. A wave translating system comprising two electric space discharge devices in cascade connection, each having a cathode, an anode and a space discharge control grid, each of said devices having a positively biased screen grid between its anode and its control grid for reducing its anode-control grid electrostatic capacity, and the second of said devices having its control grid fed from the first device and having a positively biased space charge reducing grid principally in the same surface as its control grid and at substantially the same location as said control grid with respect to its anode and its cathode.

3. A wave translating system comprising two electric space discharge devices in cascade connection, each having a cathode, an anode and a space discharge control grid, each of said space discharge devices having a positively biased screen grid between its anode and its control grid for reducing its anode-control grid electrostatic capacity, the second of said space discharge devices having its control grid fed from the first device and having a positively biased space charge reducing grid principally in the same surface as its control grid and at substantially the same location as said control grid with respect to its anode and its cathode, and the first of said space discharge devices having a conducting grid connected to its cathode and interposed between its anode and its screen grid, for shielding its anode from its screen grid.

4. The combination with an electric space discharge device comprising an anode, a cathode, two electrically separate grid electrodes principally in the same surface interposed between said cathode and said anode, a third grid electrode interposed between said two grid electrodes and said anode, and a fourth conducting grid interposed between said anode and said third grid electrode, of means for supplying to one of said two grid electrodes voltage waves and a negative biasing voltage adapting that electrode to serve as a control grid, means for supplying to the other of said two grid electrodes a positive biasing voltage adapting it to serve as a space charge grid, means for supplying to said third grid electrode a positive biasing potential adapting it to serve as a screen grid for lessening the electrostatic capacity between said anode and said control grid, and means connecting said fourth conducting grid to said cathode and adapting said fourth conducting grid to shield said anode from said electrodes.

5. The combination with an electric space discharge device comprising an anode, a cathode, two electrically separate grid electrodes principally in the same surface interposed between said cathode and said anode, a third electrode between said two grid electrodes and said cathode, and a fourth electrode interposed between said two grid electrodes and said anode, of means for supplying to one of said two grid electrodes voltage waves and a negative biasing voltage adapting that electrode to serve as a control grid, means for supplying to the other of said two grid electrodes a positive biasing voltage adapting it to serve as a space charge reducing electrode, means for supplying a smaller positive biasing voltage to said third electrode for adapting said third electrode to serve as another space charge reducing electrode, and means for supplying to said fourth electrode a positive biasing potential adapting it to serve as a screen for lessening the electrostatic capacity between said anode and said control grid.

6. The combination with an electric space discharge device comprising an anode, a cathode, two electrically separate grid electrodes principally in the same surface interposed between said cathode and said anode, a third electrode interposed between said two grid electrodes and said anode, a fourth electrode between said two grid electrodes and said cathode, and a conducting grid interposed between said anode and said third grid electrode, of means for supplying to one of said two grid electrodes voltage waves and a negative biasing voltage adapting that electrode to serve as a control grid, means for supplying to the other of said two grid electrodes a positive biasing voltage adapting it to serve as a space charge reducing electrode, means for applying a smaller positive biasing voltage to said fourth electrode for adapting said third electrode to serve as another space charge reducing electrode, means for supplying to said third electrode a positive biasing potential adapting it to serve as a screen for lessening the electrostatic capacity between said anode and said control grid, and means connecting said conducting grid to said cathode and adapting that grid to shield said anode from said electrodes.

HAROLD S. BLACK.